Figure 20:
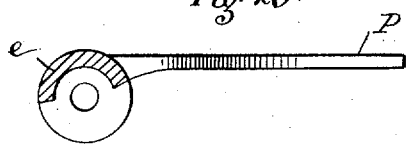

(No Model.) 7 Sheets—Sheet 1.
J. A. DEPORT.
BREECH MECHANISM FOR ORDNANCE.
No. 567,225. Patented Sept. 8, 1896.
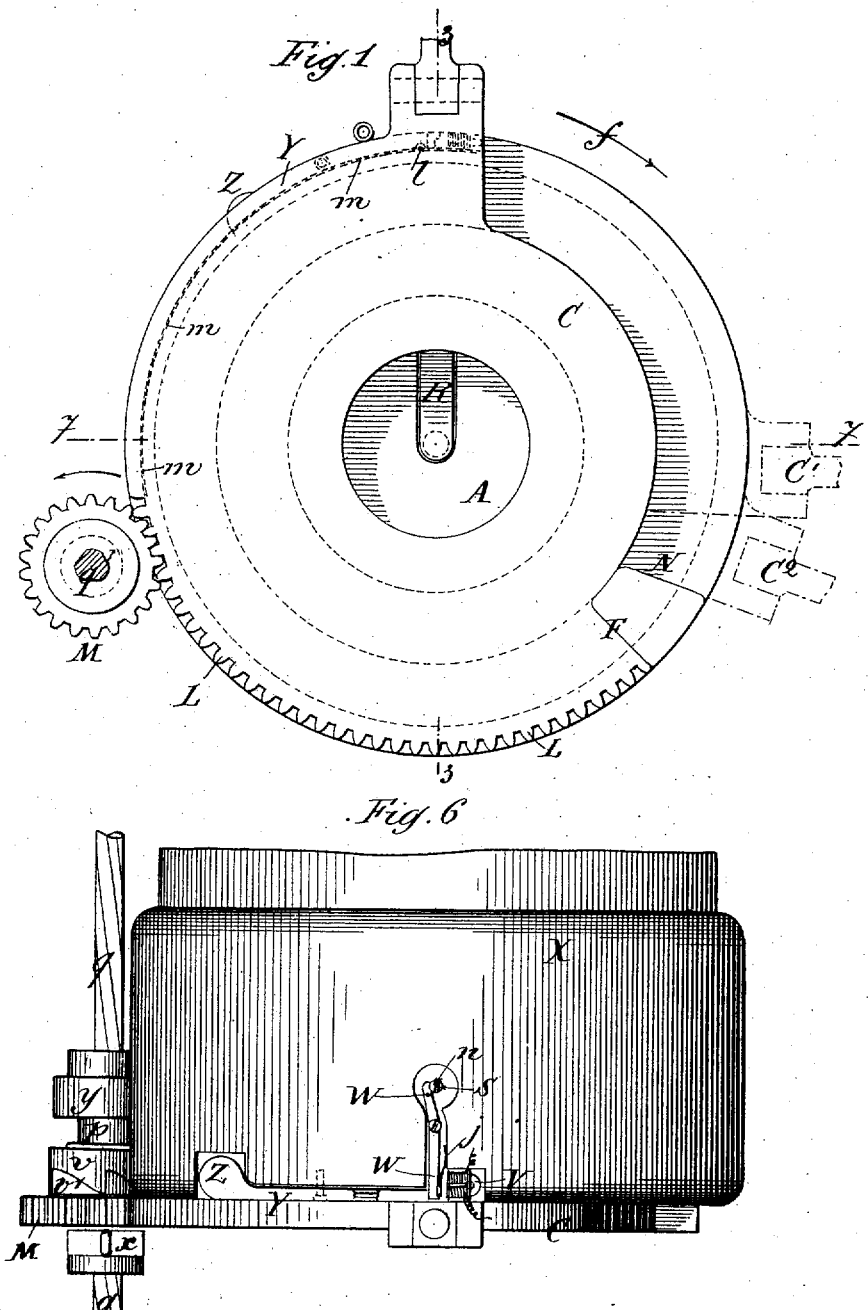
WITNESSES:
Fred White
Thomas F Wallace
INVENTOR.
Joseph Albert Deport,
By his Attorneys
Arthur C. Fraser & Co (No Model.) 7 Sheets—Sheet 2.
J. A. DEPORT.
BREECH MECHANISM FOR ORDNANCE.
No. 567,225. Patented Sept. 8, 1896.
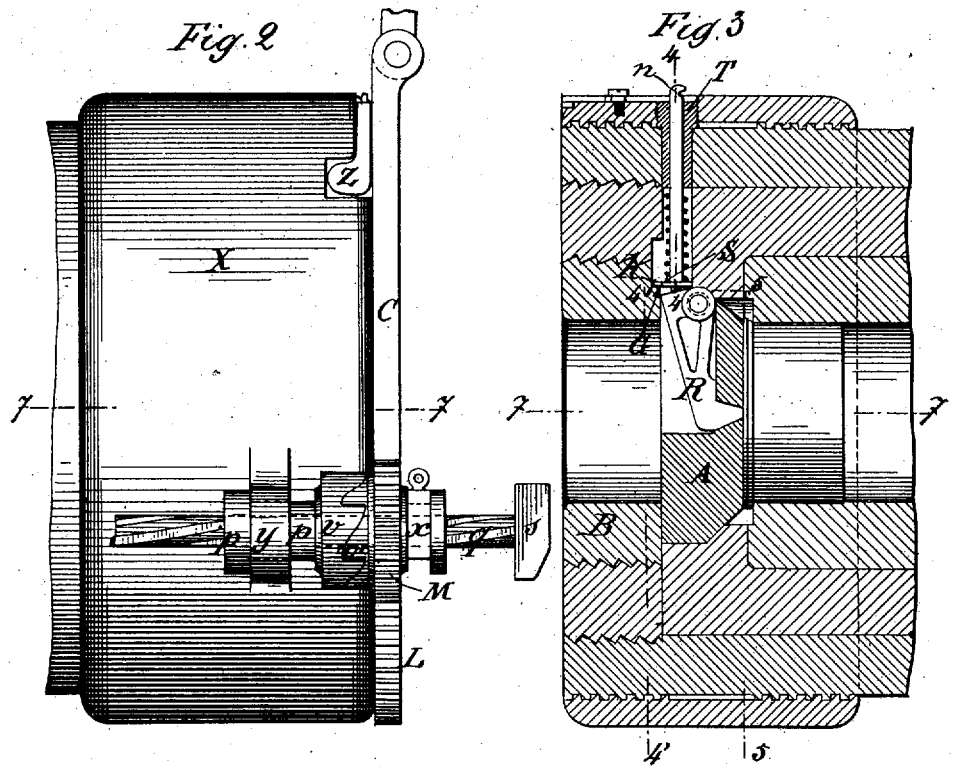
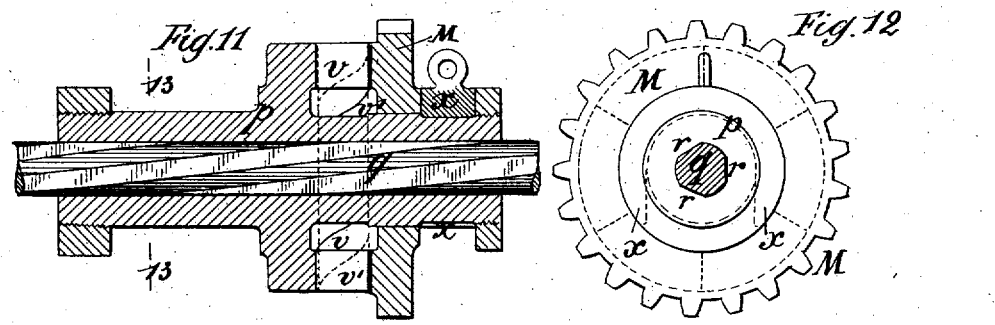
WITNESSES:
Fred White
Thomas F Wallace
INVENTOR:
Joseph Albert Deport,
By his Attorneys:

(No Model.) 7 Sheets—Sheet 3.
J. A. DEPORT.
BREECH MECHANISM FOR ORDNANCE.
No. 567,225. Patented Sept. 8, 1896.
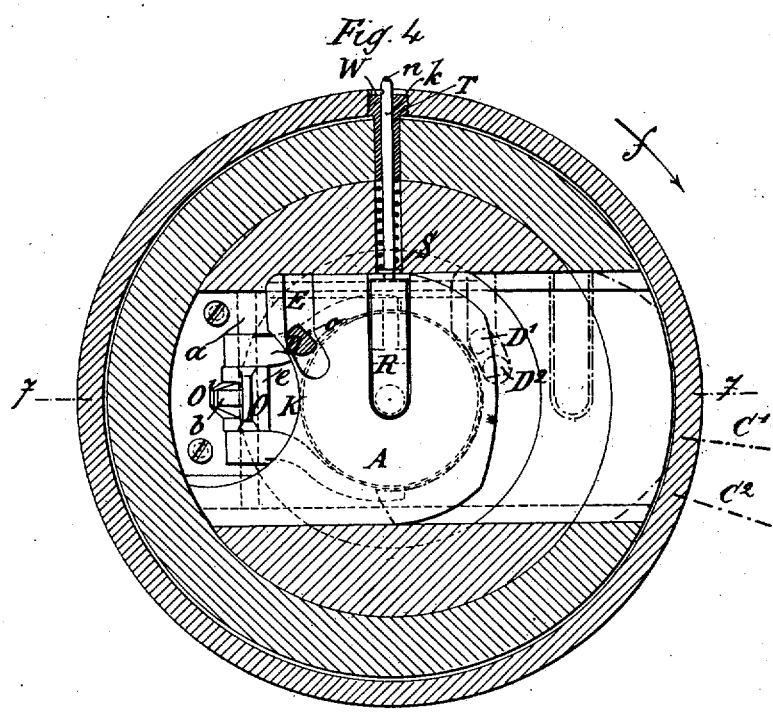
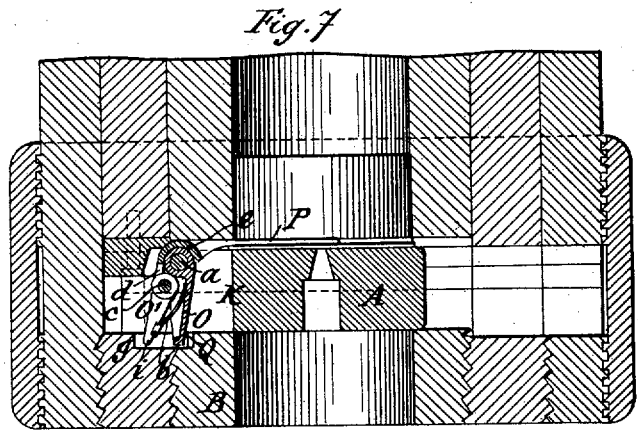
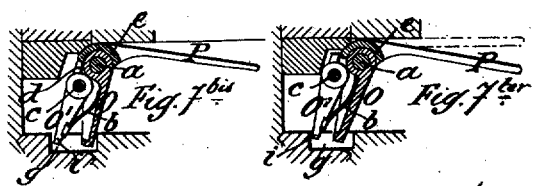
WITNESSES:
Fred White
Thomas F. Wallace
INVENTOR:
Joseph Albert Deport,
By his Attorneys
Arthur C. Fraser & Co.

(No Model.) 7 Sheets—Sheet 4.
J. A. DEPORT.
BREECH MECHANISM FOR ORDNANCE.
No. 567,225. Patented Sept. 8, 1896.
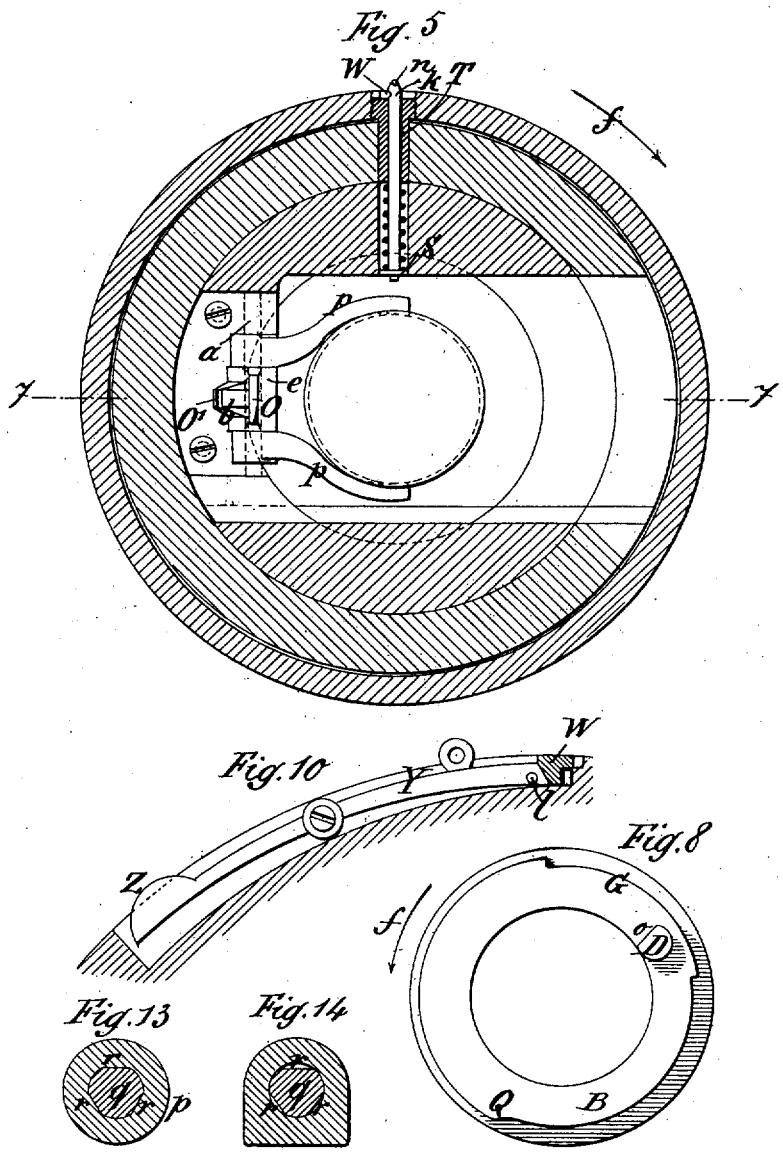
WITNESSES:
Fred White
Thomas F. Wallace
INVENTOR:
Joseph Albert Deport,
By his Attorneys:
Arthur C. Fraser & Co.

(No Model.) 7 Sheets—Sheet 5.
J. A. DEPORT.
BREECH MECHANISM FOR ORDNANCE.
No. 567,225. Patented Sept. 8, 1896.
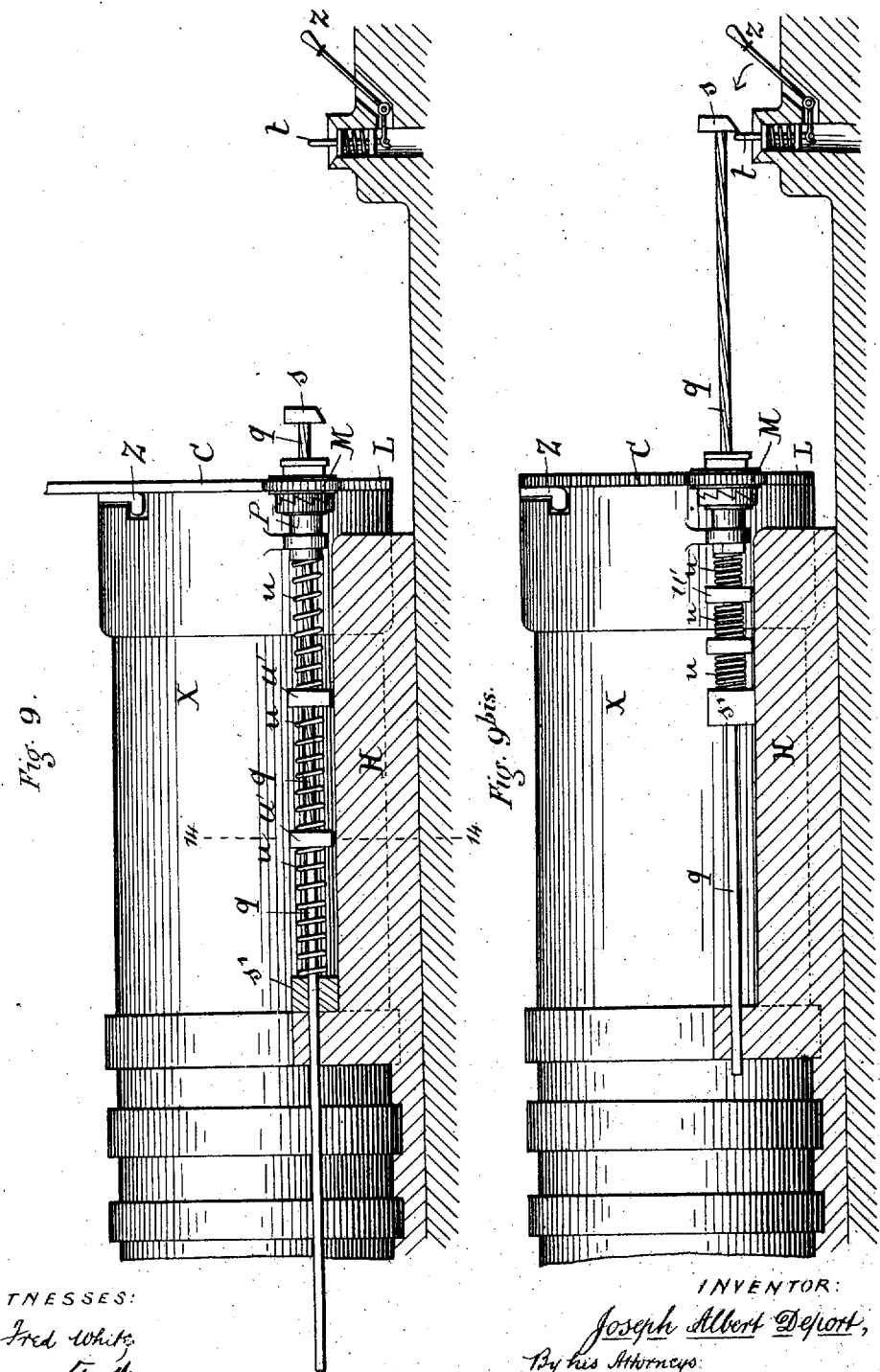
WITNESSES:
Fred White
Thomas F. Wallace
INVENTOR:
Joseph Albert Deport,
By his Attorneys
Arthur E. Fraser & Co.

(No Model.) 7 Sheets—Sheet 6.
J. A. DEPORT.
BREECH MECHANISM FOR ORDNANCE.
No. 567,225. Patented Sept. 8, 1896.
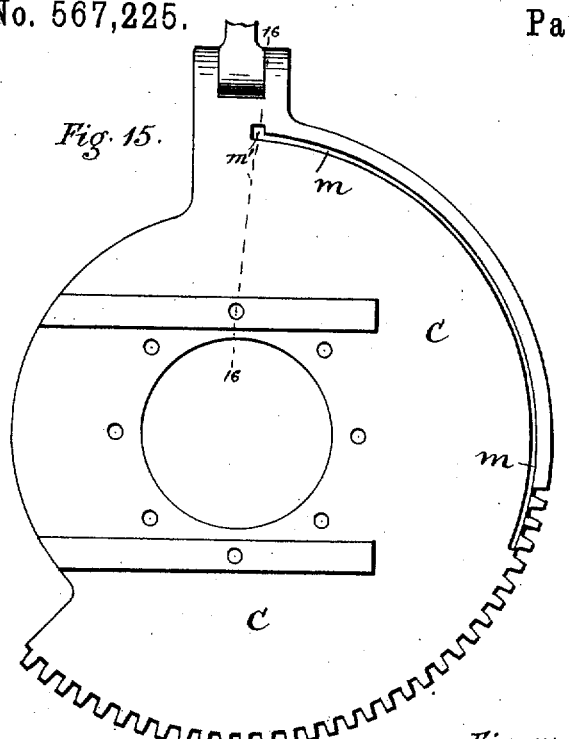
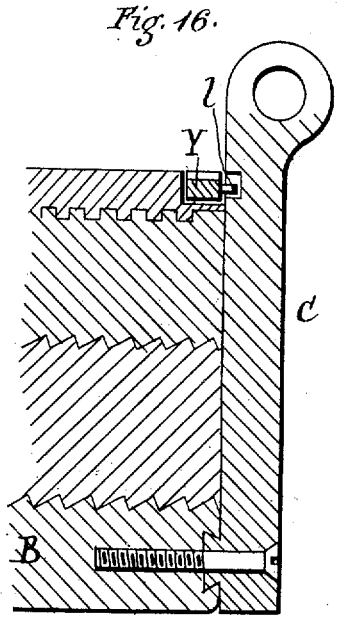
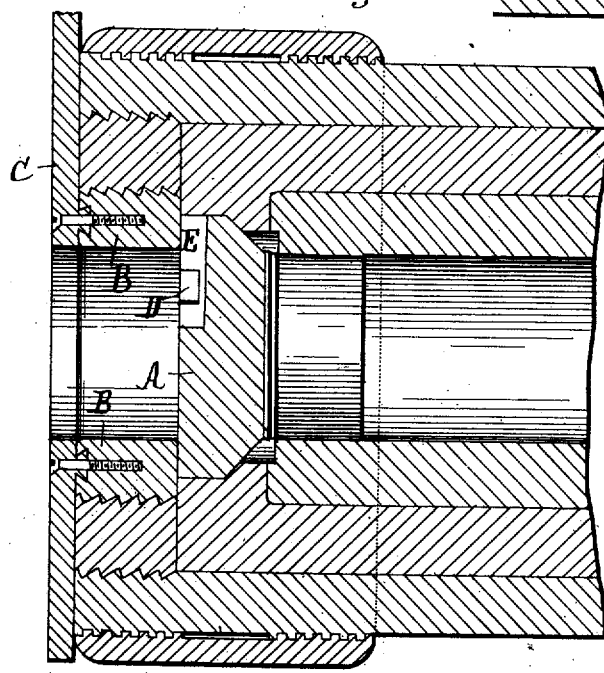
WITNESSES
Fred White
Thomas F. Wallace
INVENTOR:
Joseph Albert Deport,
By his Attorneys (No Model.) 7 Sheets—Sheet 7.
J. A. DEPORT.
BREECH MECHANISM FOR ORDNANCE.
No. 567,225. Patented Sept. 8, 1896.
*Fig. 18.* 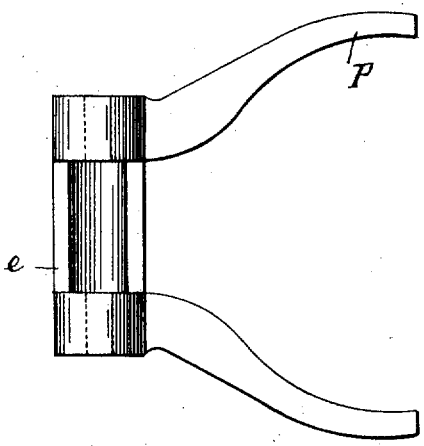  *Fig. 19.* 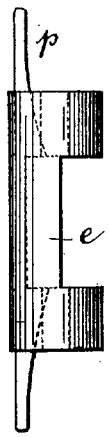

*Fig. 21.* *Fig. 22.* 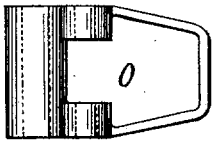   *Fig. 24.* *Fig. 25.* 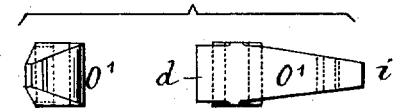
*Fig. 23.* 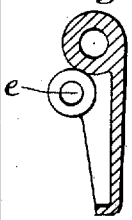  *Fig. 24.* 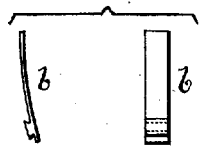  *Fig. 26.*
WITNESSES:
Fred White
Thomas F Wallace
INVENTOR:
Joseph Albert Deport,
By his Attorneys:
Arthur E. Dresser & Co

UNITED STATES PATENT OFFICE.

JOSEPH ALBERT DEPORT, OF PARIS, FRANCE.

BREECH MECHANISM FOR ORDNANCE.

SPECIFICATION forming part of Letters Patent No. 567,225, dated September 8, 1896.

Application filed May 28, 1895. Serial No. 550,916. (No model.) Patented in England April 19, 1895, No. 7,873.

*To all whom it may concern:*

Be it known that I, JOSEPH ALBERT DEPORT, a citizen of the Republic of France, residing in Paris, France, have invented certain new and useful Improvements in the Breech Mechanism for Quick-Firing Guns, (being the subject-matter of Letters Patent in Great Britain, No. 7,873, dated April 19, 1895,) of which the following is a specification.

This invention relates to breech mechanism for quick-firing guns, so arranged that the breech opens automatically either during the return to battery or during the recoil of the gun after a certain portion of the movement has been completed, the cartridge-shell being ejected during the opening movement. Furthermore, part of the energy of the recoil is stored in a spring, so as to provide for the closing of the breech on merely releasing a bolt which holds this spring in tension. The working of the breech may, however, be done by hand in the usual way.

Figure 1 is an end view of the gun, showing the breech closed. Fig. 2 is a view of the left side of the rear part of the breech. Fig. 3 is a vertical section on the line 3 3 of Fig. 1. Fig. 4 is a transverse section on the broken lines 4 4 and 4' 4' of Fig. 3. Fig. 5 is a transverse section on the broken lines 4 4 and 5 5 of Fig. 3. It is similar to Fig. 4, the breech-plate being supposed to be removed. Fig. 6 is a plan of the rear part of the breech. Fig. 7 is a sectional plan on the line 7 7 of Figs. 1 to 5. Figs. $7^{bis}$ and $7^{ter}$ are fragments of Fig. 7, showing the parts in two different positions. Fig. 8 is a view of the internal face of the breech-screw. Fig. 9 is a side view, on a reduced scale, showing the automatic opening and closing mechanism. Fig. $9^{bis}$ is a similar side view showing the parts in a different position. Fig. 10 is a fragmentary vertical section cut just forward of the crank-plate C. Figs. 11 to 14 are detail views, on a larger scale, of the automatic breech-operating mechanism, Fig. 11 being a longitudinal section, and Figs. 12, 13, and 14 transverse sections. Fig. 15 is a front view of the crank-plate C removed. Fig. 16 is a fragmentry longitudinal section, on an enlarged scale, taken on the line 16 16 in Fig. 15 and showing the plate C and the adjoining portions of the breech. Fig. 17 is a diametrical longitudinal section through the breech of the cannon. Figs. 18, 19, and 20 show the ejector-fork in rear and side elevation and in mid-section. Figs. 21, 22, and 23 show the arm O thereof in end and side elevation and in mid-section. Figs. 24, 25, and 26 are three views of the arm or dog O' thereof. Fig. 27 includes two views and the spring $b$ thereof.

For the sake of clearness I will first describe the closing mechanism as being worked by hand, and will then describe the mechanism for operating it automatically.

Referring to the drawings, A is a sliding breech-plate, which bears against a hollow breech-screw B, concentric with the axis of the gun and worked by a crank-plate C, which is fixed to the screw by dovetail tenons, as shown in Figs. 15 and 17. The screw has a stud D, Figs. 4 and 8, which is engaged in a partly-curved slot E in the plate A. A stop F, Fig. 1, formed on the rear of the breech, limits the extent of rotation of the screw in the closing movement.

When the crank-plate C is turned to the dotted position C', Figs. 1 and 4, the stud of the screw takes the dotted position D', Fig. 4, and the breech is quite open, for the hollow K of the breech-plate is then in line with the bore; but the curved part of the slot E allows the screw to be further turned till the crank attains the position $C^2$, Figs. 1 and 4, the stud D being then at $D^2$, Fig. 4. In this additional movement of the crank from C' to $C^2$ the slot E, in which D moves, having become concentric with the axis of the breech-screw, there is no further movement of the breech-plate. The rotation of the crank-plate for opening the breech is limited by the stop N on the rear of the breech.

The extractor, Figs. 4, 5, and 7, consists of an arm O, Figs. 21 to 23, and two fork-arms P, all pivoted on a rod $a$. It carries a pawl O', Figs. 24 to 26, with spring $b$, Fig. 27, the pawl being pivoted at $c$ in a projection from O. When the breech-screw is turned in the direction of the arrow $f$, Figs. 1, 4, 5, and 6, to open the breech, a cam Q, Figs. 7 and 8, cut in the front of the screw B, acts against the arm O, moving the pivot $c$ to the left, and with it the pawl O', so that the tooth $d$ of this pawl acts on the boss $e$, which is integral with the arms P of the extractor. When the end $i$ of the pawl O' meets the end of the recess $g$, formed for it in the gun, (see Fig. $7^{bis}$,) the pawl O' is stopped, but the arm O, being still pushed by the cam Q, approaches the pawl O', and finally the tooth $d$ escapes from the shoulder of the boss $e$ and takes position to the left, as shown in Fig. $7^{ter}$. The fork-arms P are now no longer held back, but may be moved forward into their recess when the gun is charged, as shown by the dotted lines in Fig. $7^{ter}$, and the cartridge can be pushed fully in before the closing of the breech. It is not till after the closing that the arm O and pawl O' are no longer acted on by the cam Q, whereupon the spring $b$ returns them to the position shown in Fig. 7.

The firing mechanism consists of a hammer R, Figs. 1, 3, and 4, carried by the breech-plate A, to which it is hinged. It is thrown forward by a sliding bolt or spring-rod S, Figs. 3, 4, and 5, the spring bearing at one end against a sleeve T, screwed into the gun, and at the other end against a shoulder $h$, Fig. 3. This shoulder bears on a cam-segment G, formed on the front of the breech-screw. (See Fig. 8.) When the screw is turned in the direction of the arrow $f$, (to open the breech,) the cam-segment G lifts the rod S, and when the movement is sufficient the nose of the sear W, (see Figs. 4, 5, and 6,) acted on by a spring $j$, Fig. 6, engages in a notch $k$ of the rod S, holding it in cock while the screw is turned back to close the breech. Under the rear end of the sear W (see Figs. 1 and 6 and enlarged view, Fig. 10) is arranged the trigger Y, a stud $l$ of which is engaged, as shown in Fig. 16, in a safety-groove $m$, Fig. 15, formed in the crank-plate C concentric with the axis, this groove preventing release of the sear except when the breech is quite closed, in which position a widened portion $m'$ of the groove coincides with the stud $l$ and allows it sufficient freedom for effecting release of the sear when the button Z of the trigger is pressed. In case of failure to fire the cocking can be effected without opening the breech by pulling up the rod S, the head of which is formed with a hook or eye $n$, (see Figs. 3, 4, 5, and 6,) or the head of the rod S may be struck with a wooden mallet.

The manual operation of the breech mechanism is as follows: The breech being assumed to be closed and the hammer R forward, as after firing, on turning the crank-plate C till it meets the stop N, Fig. 1, for opening, the cam G cocks the rod S, the breech-plate A is slid open, and the cam Q actuates the extractor, which ejects the cartridge-shell backwardly. A fresh cartridge can then be introduced and by a backward movement of the crank-plate the breech is closed, which brings the hammer R quite close to the spring-rod S. It is then only necessary to press the button Z of the trigger Y in order to fire.

Fig. 6 shows a simple arrangement for firing electrically from a distance by sending an electric current through the coil of an electromagnet V, the poles of which attract an armature on the tail of the sear W, causing its release.

It is to be noted that the opening of the breech is facilitated by the shape of the stud D, which is flattened at $o$, giving a certain play to the breech-screw in the opening direction without moving the breech-plate, so that the breech-screw thus acts as a striking crank. The shape of stud D nevertheless insures the exact position and firm hold of the breech-plate in its two extreme positions, for in the closed position it is held by stud D against the body of the gun, and in the open position the stud D is so engaged in the groove E as to hold the plate A both ways, as shown at $D^2$ in Fig. 4.

For automatic action the crank-plate C is formed at its circumference (see Figs. 1, 2, 6, and 9) with cogs L to gear with a pinion M, mounted on the gun, which operates as will hereinafter be described. The gun X is carried on a slide H, Fig. 9, running on suitable rollers. The pinion M (shown to an enlarged scale in section, Fig. 11, and front view, Fig. 12) is mounted loose on a sleeve $p$, through which passes a bar $q$, having helical guiding-flats $r$, as shown in Figs. 13 and 14, which are sections on the line 13 13 of Fig. 11 and 14 14 of Fig. 9. The bar $q$ has a head $s$ at one end and a boss $s'$ near its opposite end. The head $s$ serves to hook the bar $q$ to a spring-bolt $t$ on the slide, (see Fig. $9^{bis}$,) while the boss $s'$ forms a shoulder against which abuts a spring $u$, which surrounds the bar $q$. This shoulder also prevents the bar $q$ from turning by having its bottom flat and working over the flat top of the slide, and when at rest it abuts against the shoulder of the carriage H, as shown in Fig. 9. The spring $u$ is preferably in sections with loose non-rotative blocks $u'$ intervening, one of which is shown in Fig. 14.

The pinion M is free on the sleeve $p$, but both have clutch-teeth $v$ $v'$, Figs. 2, 6, and 11, which can be engaged or disengaged by a filling block or fork $x$, which is placed behind the pinion and the rear shoulder of $p$ when the clutch is engaged, as shown in Figs. 2 and 11; but in order to disengage the clutch this fork may be placed in front between the front shoulder of the sleeve $p$ and the front of the collar $y$, which the gun carries when the clutch is disengaged.

The bar $q$ (of which Figs. 13 and 14 show sections by way of examples) has three flats helically formed on it, or instead of flats they might be helical ribs or grooves of various forms.

During recoil the gun X, carried by slide H, slides parallel to the cradle or slide, carrying with it the bar $q$, the sleeve $p$, and the pinion M. The head $s$ of the bar, having an inclined side, pushes down the bolt $t$ as it passes. This bolt then rises and holds the head $s$ of the bar $q$ when the gun is advanced to firing position, so that the bar $q$ is made to slide relatively to the gun, the bar being held by the bolt $t$. This relative movement causes the sleeve $p$, which accompanies the gun in its forward movement, to revolve upon the stationary bar $q$ in consequence of the helical guides on the latter, and the sleeve $p$ turns the pinion M, which is clutched to it, and which through the teeth L causes the crank-plate C to turn, thus automatically opening the breech. The advance movement of the gun while the bar $q$ remains stationary also causes compression of the spring $u$.

When the gun is loaded, it needs only to push down the bolt $t$ by moving the handle $z$ in the direction indicated by the arrow, whereupon the spring $u$ draws forward the bar $q$ to its original position, and as the bar cannot turn, by reason of its boss $s'$, it causes the pinion M to rotate backward, and then effects the automatic closing of the breech.

In order to work the breech by hand, the pinion M is disengaged from L by placing the fork $x$ from the back to the front, as has been previously stated.

The automatic breech-operating mechanism just described may be adapted to operate in many different ways without departing from the essential features of this portion of my invention.

In another application which I have filed, Serial No. 550,814, May 27, 1895, I have shown a construction of hammer and spring-bolt for operating it, which is a separate specific embodiment of the construction specified in my first claim herein.

I claim as my invention the following defined novel features, substantially as hereinbefore specified, namely:

1. The combination in a breech-loading cannon of a movable breech-plate, a hammer carried by said plate and hinged thereto, and a movable bolt mounted on the breech in position to engage with and operate the hammer when the breech is closed.

2. The combination in a breech-loading cannon of a movable breech-plate, a hammer carried by said plate and hinged thereto, and a movable bolt mounted in the gun in position coinciding with said hammer when the breech is closed, consisting of a sliding rod, a spring pressing said rod downwardly, and a sear engaging a shoulder on said rod to hold it cocked.

3. The combination in a breech-loading cannon of a movable breech-plate, an oscillating breech-screw connected thereto, a cocking-cam carried by said breech-screw, a hammer carried by said breech-plate and hinged thereto, a movable bolt mounted in the gun in position coinciding with said hammer when the breech is closed, consisting of a sliding rod, a spring pressing said rod downwardly, a shoulder engaging said rod with said cocking-cam, and a sear engaging a shoulder on said rod to hold it cocked.

4. In a breech-loading cannon, the combination with a reciprocatory breech-actuating part having a cam-face Q, of a jointed extractor having a loose arm actuated by said cam, and an escape-pawl for communicating movement from said loose arm to the extractor, and means for disengaging the escape-pawl.

5. In a breech-loading cannon, the combination of sliding breech-plate A, breech-screw B having cam Q, extractor P having loose arm O actuated by said cam, escape-pawl O', and recess $g$ having a shoulder for disengaging said escape-pawl.

6. In a breech-loading cannon, the combination of oscillatory breech-screw B and sliding breech-plate A, a projecting stud D on the screw having a flat face $o$, and a groove E in the breech-plate engaged by said stud, whereby said flat face gives free motion to the breech-screw in beginning the opening, while insuring the exact position of the breech-plate at the extremities of its movement.

7. The combination with a breech-loading cannon mounted to slide backwardly during the recoil, of automatic mechanism for operating the breech comprising a sliding bar formed with helical guides, a rotative part carried with the cannon and actuated by engagement with said guides, and means for engaging said bar during the longitudinal movement of the cannon to hold it stationary and thereby communicate rotary motion to said part for actuating the breech mechanism.

8. The combination with a breech-loading cannon having an oscillatory actuating-plate C with gear-teeth L and mounted to slide backward during the recoil, of automatic mechanism for operating the breech, consisting of a pinion M meshing with said gear-teeth, a sliding bar $q$ having helical guides for turning said pinion and having means for holding it against rotation, means for engaging said bar in the recoil movement of the cannon to hold it during the forward movement of the cannon, whereby during such movement its helical guides rotate the pinion and open the breech, and a spring arranged to be put under tension during such movement, whereby upon the release of the bar the spring restores it to its normal position, thereby effecting the reverse rotation of the pinion and closing the breech.

9. The combination with a breech-loading cannon having an actuating-plate C, of a slide H, and mechanism for operating the breech consisting of a pinion M engaging said plate, a longitudinal sliding bar $q$ having helical guides, a spring $u$ arranged to be compressed by the longitudinal movement of said bar, means for engaging said bar to hold it stationary during the longitudinal movement of the cannon, and a clutch for disconnecting said pinion to enable the breech to be operated by hand.

In witness whereof I have hereunto signed my name in the presence of two subscribing witnesses.

JOSEPH ALBERT DEPORT.

Witnesses:
CLYDE SHROPSHIRE,
JULES AMENGAUD, Jeune.